United States Patent
Smith et al.

(10) Patent No.: US 10,521,731 B2
(45) Date of Patent: Dec. 31, 2019

(54) UNIQUE USER DETECTION FOR NON-COMPUTER PRODUCTS

(71) Applicant: ADOBE INC., San Jose, CA (US)

(72) Inventors: Kevin Gary Smith, Lehi, UT (US); William Brandon George, Pleasant Grove, UT (US)

(73) Assignee: ADOBE INC., San Jose, CA (US)

( * ) Notice: Subject to any disclaimer, the term of this patent is extended or adjusted under 35 U.S.C. 154(b) by 757 days.

(21) Appl. No.: 14/853,624

(22) Filed: Sep. 14, 2015

(65) Prior Publication Data

US 2017/0076215 A1 Mar. 16, 2017

(51) Int. Cl.
*G06N 20/00* (2019.01)

(52) U.S. Cl.
CPC .................. *G06N 20/00* (2019.01)

(58) Field of Classification Search
CPC ... G06N 99/005; G06N 20/00; G06Q 30/0201
USPC ......................................................... 700/188
See application file for complete search history.

(56) References Cited

U.S. PATENT DOCUMENTS

| 8,140,344 | B2* | 3/2012 | Kameyama | ........ B60H 1/00742 |
| | | | | 382/104 |
| 9,349,230 | B1* | 5/2016 | Doyen | ................ G07C 9/00103 |
| 2003/0233153 | A1* | 12/2003 | Grier | ......................... B60S 3/04 |
| | | | | 700/11 |
| 2005/0226475 | A1* | 10/2005 | Basile | ................ G07C 9/00158 |
| | | | | 382/124 |
| 2006/0018012 | A1* | 1/2006 | Smith | ................ G02B 17/0808 |
| | | | | 359/366 |
| 2008/0086533 | A1* | 4/2008 | Neuhauser | ............. G06Q 10/00 |
| | | | | 709/206 |
| 2009/0204310 | A1* | 8/2009 | Gittere | ................... G07C 5/008 |
| | | | | 701/102 |
| 2010/0128112 | A1* | 5/2010 | Marti | ...................... G06F 3/011 |
| | | | | 348/51 |
| 2013/0282442 | A1* | 10/2013 | Alderman | .......... G06Q 10/0637 |
| | | | | 705/7.36 |
| 2013/0304536 | A1* | 11/2013 | Hamachi | ............ G06Q 30/0201 |
| | | | | 705/7.29 |
| 2014/0089049 | A1* | 3/2014 | Cristofaro | .......... G06Q 30/0203 |
| | | | | 705/7.32 |
| 2014/0259032 | A1* | 9/2014 | Zimmerman | ...... H04N 21/4667 |
| | | | | 725/9 |
| 2014/0275834 | A1* | 9/2014 | Bennett | .................. B60N 2/919 |
| | | | | 600/301 |
| 2015/0018991 | A1* | 1/2015 | Arnold | .................... G06F 19/00 |
| | | | | 700/91 |

(Continued)

*Primary Examiner* — Sung Il Cho
(74) *Attorney, Agent, or Firm* — Shook, Hardy & Bacon LLP (57) ABSTRACT

Unique users and/or the current user of a non-computer product are identified. Sensor data is collected from sensors on the non-computer product. The sensor data provides data regarding settings and/or usage patterns of the non-computer product. The sensor data is provided to an analytics engine, which analyzes the sensor data using machine-learning techniques to identify unique users of the non-computer product and/or a current user of the non-computer product. Analytics that include at least an indication of the unique users are provided to a product manufacturer and/or other entity (e.g., a retailer).

20 Claims, 5 Drawing Sheets

(56) References Cited

U.S. PATENT DOCUMENTS

| | | | |
|---|---|---|---|
| 2015/0302425 A1* | 10/2015 | Borger | G06Q 30/0201 705/7.29 |
| 2016/0010378 A1* | 1/2016 | Ziemkowski | E06B 11/085 49/31 |
| 2016/0100158 A1* | 4/2016 | Chen | G09G 5/00 345/156 |
| 2016/0270718 A1* | 9/2016 | Heneghan | G16H 50/20 |

* cited by examiner

UNIQUE USER DETECTION FOR NON-COMPUTER PRODUCTS

BACKGROUND

Product creators like to know who is using their product and how they are using it so that they can collect better analytics and customize the experience for each user to provide a better experience. In the context of online services, users have traditionally been identified through the use of browser cookies and user logins. Computer programmers have recently developed new methods outside of cookies and user logins to determine unique visitors using the same device. One such method is called "fingerprinting," which collects enough metadata from the use of an online service to uniquely identify the visitor. This metadata could include IP address, configuration settings, and even usage and behavior patterns.

However, non-computer products in the real world have not had the same opportunities. Use of such non-computer products can't be tracked using any cookies or user logins. Additionally, use of such non-computer products is not tied to any online service that affords an opportunity for collecting metadata that may be analyzed using fingerprinting techniques. For example, there are no cookies in a car to say how many unique drivers drive it, and a lawn mower cannot tell the difference between a husband and wife mowing the lawn.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention generally relate to identifying unique users of non-computer products. Sensors on a non-computer product collect sensor data that is communicated from the non-computer product to an analytics engine. The sensor data reflects settings and/or usage of the non-computer product during multiple uses of the non-computer product by one or more users. The analytics engine analyzes the sensor data using, for instance, machine-learning or fingerprinting techniques. The analysis identifies one or more unique users of the non-computer product based on settings and/or usage patterns from various uses of the non-computer product. Analytics, including identification of unique users, are provided to the product manufacturer, retailer, and/or other entity. The analytics provided to a product manufacturer are significantly improved by understanding the unique users of the non-computer product, and the product manufacturer may be given a better understanding of the product manufacturer's user base. Additionally, once unique users of a non-computer product have been identified, a current user of the non-computer product may be identified by comparing current settings/usage patterns to the settings/usage patterns of the previously identified unique users. A better experience can then be provided to users given a better understanding of how many unique users use the non-computer product and/or who is currently using the non-computer product.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various terms are used throughout this description. Definitions of some terms are included below to provide a clearer understanding of the ideas disclosed herein.

A "non-computer product" refers to a product whose primary function is unrelated to providing computer processing capabilities and does not rely on a connection to an online service. This excludes computing devices, such as PCs, tablets, and smartphones, whose primary function is to provide computer processing capabilities and/or relies on a connection to online services. While a non-computer product in accordance with embodiments of the present invention may include components that provide processing and data communication capabilities, these capabilities are secondary and are not required to provide the non-computer product's primary function. By way of example to illustrate, a lawn mower's primary function is to mow grass, and a shirt's primary function is to provide clothing to protect a wearer from the surrounding environment.

As used herein, a "user" refers to a person using a non-computer product. A "unique user" is a user who has been identified as being different from another user of the same non-computer product.

"Sensors" refer to devices on a non-computer product capable of detecting characteristics of the non-computer product and/or its environment.

"Sensor data" is used herein to refer to data collected by one or more sensors on a non-computer product. The sensor data includes data regarding settings on a non-computer product and/or information that may be used to identify usage patterns of the non-computer product. The sensor data is not data that by itself identifies a unique user. Instead, as will be described in further detail herein, the sensor data must be analyzed to identify unique users of the non-computer product.

While it's been possible to identify unique users of online services via cookies, user logins, or fingerprinting from metadata, similar identification of unique users of non-computer products has not been available. There is no concept of cookies, user logins, or metadata for non-computer products. In the past, user information has been collected for non-computer products using things such as product registrations. However, the information gathered from product registrations is often limited to a single person and doesn't reflect that a particular non-computer product may be used by multiple individuals.

Accordingly, embodiments of the present disclosure address these technological problems by providing solutions for identifying unique users of non-computer products. Generally, embodiments derive from the inventors' realization that nearly every non-computer product has some form of user interface that reflects how a user interacts with the non-computer product. While some non-computer products, such as a car, have more varied and complex user interactions, even simple non-computer products, such as a shirt, have user interactions. For instance, the user interactions for a shirt include how often the user wears the shirt, how often the user washes the shirt, whether the user exercises in the shirt, how much the user sweats into the shirt, and the user's sweat patterns into the shirt.

In accordance with embodiments of the present invention, sensors embedded in a non-computer product provide sensor data that reflects the different ways users interact with the non-computer product. The sensor data is provided to an analytics engine that analyzes the sensor data to identify unique user(s) of the non-computer product and/or a user currently using the non-computer product. It should be understood that identifying unique users does not include identifying any personal information that would allow for actual identification of a person. Instead, the information merely identifies users of a non-computer product as being unique or distinct from one another. The analysis may employ any of a variety of known machine-learning techniques, which may include known fingerprinting algorithms. For instance, in some configurations, clustering is performed based on features of the sensor data.

By way of example to illustrate, a lawn mower is provided with a number of different sensors to collect settings information. For example, the handle can be set to different angles. The bag can be on or off. Mulch settings can be varied, and the wheels on the lawn mower can be raised and lowered. Additionally, sensors on the lawn mower collect information regarding usage patterns. The usage patterns can include: how fast the person walks; the patterns the lawn mower follows; whether breaks are taken and where; how often the bag is emptied; and whether the gas is always filled before use. The settings and usage pattern information derived from the sensors on the lawn mower are analyzed to identify unique users of the lawn mower and/or who is currently using the lawn mower.

Analytics provided to non-computer product manufacturers can be significantly improved by understanding unique users of non-computer products. For example, it can be determined if lawn mowers are frequently shared by neighbors or whether particular models of lawn mowers perform better for taller or shorter people. Better analytics yields opportunities for better product enhancement. For example, the lawn mower manufacturer could promote neighborhood sharing programs and market higher end lawn mowers to such programs with the expectation that a group of people would be more willing to pay more money for a lawn mower than a single individual. As another example, the lawn mower manufacturer can improve product features and versatility based on the different types of users.

Understanding the unique users can also improve analytics by providing a better understanding of the manufacturer's total audience or user base. For example, a lawn mower manufacturer may traditionally estimate its audience size as the number of lawn mowers it has sold combined with the expected life expectancy of the lawn mowers. However, employing embodiments of the present invention would provide the lawn mower manufacturer a much more accurate understanding of how many people are using each lawn mower (as well as how many lawn mowers are still in operation). Furthermore, determining audience size and unique users can be especially useful for non-computer products which advertise to users, such as televisions and radios. (Information collected for these devices might include things like: which channels users watch or listen to; the order in which users check the channels; the volume and whether they mute it frequently; and the angle at which they hold the remote).

In addition to analytics, a better experience can be provided to users given a better understanding of how many unique users use the non-computer product and/or who is currently using the non-computer product. For example, a lawn mower could automatically raise itself and adjust the handle angle based on who pushed the start button. Understanding the user provides opportunities to differentiate a non-computer product for different user types and gain competitive advantages over other manufacturers.

Figure 1:
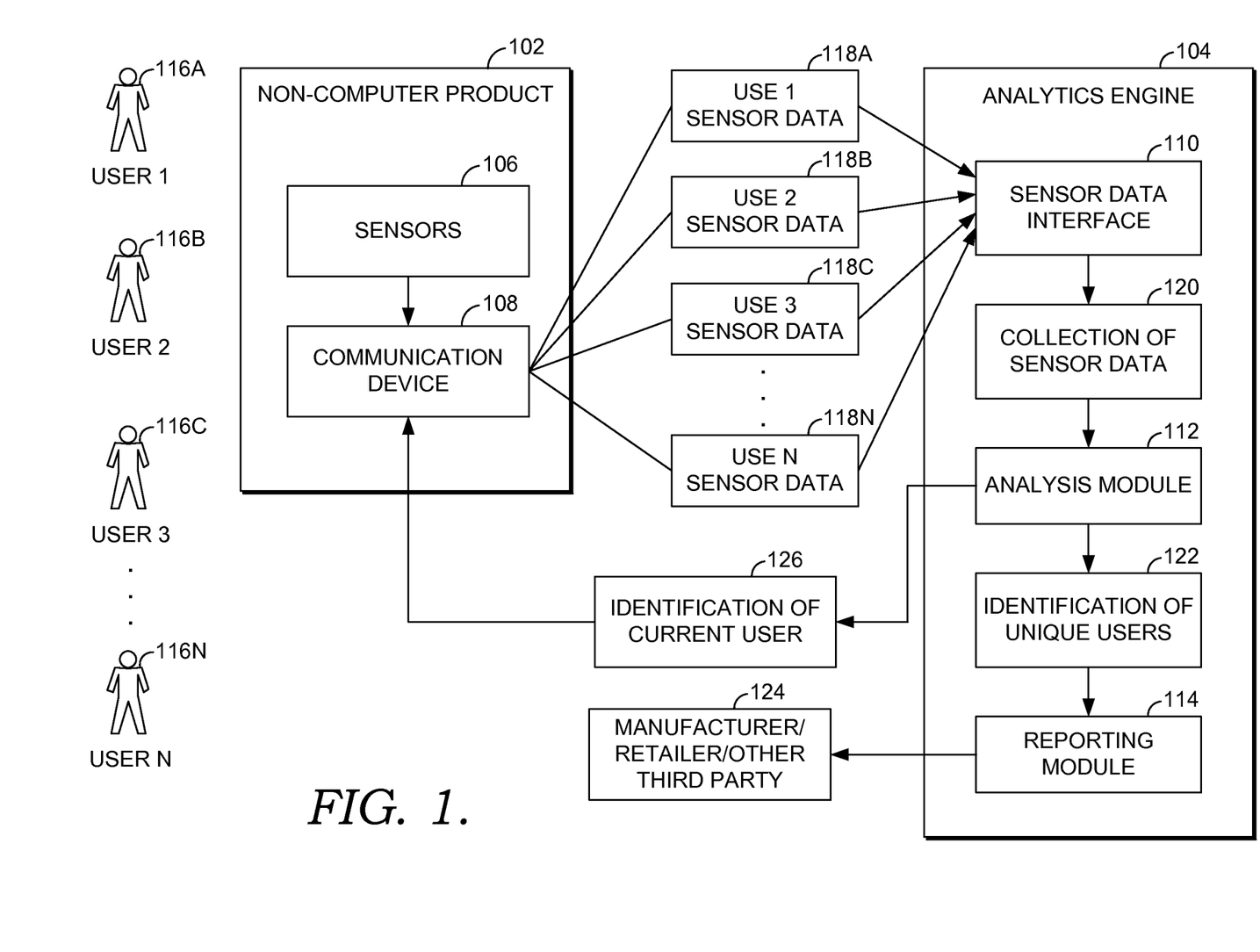
FIG. 1 is a block diagram of an exemplary system architecture in which embodiments of the invention may be employed.

Turning now to FIG. 1, a block diagram is provided illustrating an exemplary system 100 in which some embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 100 includes a non-computer product 102 and an analytics engine 104. The non-computer product 102 includes one or more sensors 106 for collecting sensor data regarding the non-computer product and/or its surrounding environment. Generally, the sensor data includes information that reflects a user interaction with the non-computer product. This includes information regarding settings of the non-computer product and/or usage patterns of the non-computer product.

The non-computer product also includes a communication device 108 for communicating sensor data from the non-computer product 102 to the analytics engine 104. In some configurations, the communication device 108 comprises a short-range radio operable communicate over a wireless air interface via standards for short-range wireless communication, such as via BLUETOOTH or WiFi standards. In other configurations, the communication device 108 comprises a long-range radio operable to communicate over a wireless air interface via standards for long-range communications, such as via LTE, CDMA, TDMA, or GSM standards. In still further embodiments, the communication device 108 requires a physical connection, such as via USB, to another device to communicate sensor data.

As shown in FIG. 1, a number of different users including user 1 116A, user 2 116B, user 3 116C, and user N 116N use non-computer product 102 at different points in time. It should be understood that any number of different users may employ the non-computer product 102, and the users shown in FIG. 1 are by way of example only. Additionally, sensor data from each use of the non-computer product 102 is communicated by the communication device 108. As shown in FIG. 1, this includes use 1 sensor data 118A, use 2 118B sensor data, use 3 sensor data 118C, and use N sensor data 118N. It should be understood that sensor data from any number of uses of the non-computer product 102 may be communicated, and the sensor data shown as communicated from the non-computer product 102 to the analytics engine 104 is by way of example only. Each time the non-computer product 102 is used by one of the users, sensor data from that use is communicated. Each user may have used the non-computer product 102 multiple times, and sensor data from each of those uses is communicated from the non-computer product 102 to the analytics engine 104.

The analytics engine 104 includes a sensor data interface 110 operable to receive sensor data from non-computer products, such as the non-computer product 102. When the analytics engine 104 receives sensor data from a non-computer product, the collection of sensor data 120 is provided to an analysis module 112. The analysis module 112 operates to employ machine-learning or other techniques to analyze the collection of sensor data 120 to identify unique users. This may include employing known fingerprinting techniques. Fingerprinting is taking a collection of configuration and usage data which individually cannot be used to identify the individual, but which collectively can be used to identify users.

The machine-learning/fingerprinting techniques use the collection of sensor data 120 that doesn't specifically identify users but is unique to the users to allow for the identification of unique users. For instance, for a lawn mower, the data might include zip code, lawn mower make and model, time of week and time of day that the lawn mower is used, height setting of both the wheels and the handle, and detailed usage patterns such as how many right turns, left turns, duration of running without stopping the lawn mower, and/or the path the lawn mower takes. Many of these items alone are not unique to a particular user—e.g., many people may have the same make and model of lawn mower. However, perhaps only 1000 of them live in the same zip code. Perhaps only 20 of them typically mow on Tuesday mornings. Using just 3 variables which are not in any way unique to a particular user, the total population of lawn mower owners have been reduced down to a small pool of 20. It is easy to see that by adding in additional data, the system can very quickly not only identify the lawn mower as a particular user's, but be able to tell the difference between that user and that user's spouse mowing.

In practice, the sensor on a non-computer product may have an ID, so things like zip code and make and model may not be relevant because they aren't needed to distinguish between different products. Instead, the sensor IDs may be used to distinguish products. However, machine-learning/fingerprinting techniques are used to distinguish unique users of a given product. For instance, in the case of a particular lawn mower, this may be to distinguish a particular user from the user's spouse and from my neighbor who borrows the lawn mower. GPS may be able to differentiate between the owner's yard and the neighbor's yard. Configuration settings such as height can differentiate between the user and the user's spouse. Even identical twins who take turns mowing the lawn will have different behavior patterns such as whether they mow the front or back first, whether they go in circles or lines, and which paths they take.

Accordingly, machine-learning/fingerprinting techniques are employed to find the patterns which identify unique users. For some products, it may be very simple to pick the X number of data points that will uniquely identify users. For others, behavior is observed for a period of time and machine learning is used to examine the data passing through to identify patterns that can be used to distinguish users. Machine learning can be used for non-computer products as long as the sensors are passing in usage and configuration data. For the lawn mower example, sensor ID, height setting, and left turns and right turns may be chosen as the foundation of the fingerprinting algorithm. However, if all usage data is being passed in and run through machine learning algorithms, each variable is examined over time and over usage to determine how much variance there is in a particular variable and how much information gain can be learned from the cardinality of that variable and how consistent the values from the variable are. For instance, machine learning may determine that number of left and right turns are too sporadic to be used but that speed is an ideal variable because it is very consistent and typically different from individual to individual.

In addition to identifying unique users, the analytics engine 104 is also configured to identify a current user of a non-computer product. When unique users have previously been identified, the analytics engine 104 may receive sensor data from a current use, and the analytics module 112 analyzes the current sensor data to identify a current user. For instance, the current sensor data may be analyzed in conjunction with previously analyzed sensor data to identify a current user as corresponding to a previously identified unique user. The identification of a current user 126 may be provided back to the non-computer product to allow, for instance, the non-computer product to adjust settings for the current user and/or otherwise provide a better experience.

In some embodiments, the analysis module 112 is configured to analyze sensor data for different types of non-computer products. In such embodiments, an identification of the type of non-computer product may be provided to the analysis module 112 to facilitate the analysis since relevant sensor data will vary from non-computer product to non-computer product. Alternatively, such identification does not need to be provided to the analysis module 112, which is able to determine the type of non-computer product based on the type of sensor data received.

On day one, the system may not be able to tell the difference between different users. Most non-computer products are session based, meaning a given user starts a session of activity, uses the product for the duration of the session, and then stops using the product (think car, lawn mower, power tool, shower, etc.). This makes it easy to analyze all the usage data within a session and correlate it together to start finding a good fingerprint for the individual. However, some non-computer products may not be session based, meaning that there is not a clear start or stop time—the device is in constant use (AC for example). Then there are some products that may have multiple users in a single session such as TVs or video games where they are handing the controller back and forth. In both of these latter cases, the system looks for significant changes in usage patterns or configuration throughout the session (e.g., the way the controller is held or manual changes in AC temperature settings) and considers behavior before and after these changes as pertaining to different users. Without user IDs, there has to be a period of observation time to determine unique users. As individuals use the devices, they get fingerprint IDs. For instance, a user's ID for a lawn mower may be Day=Tuesday|Height=57 inches|speed=1.2 mph. That user may have to use the lawn mower 10 times before the system is confident enough that this ID uniquely identifies the user. For some products that are highly configurable, it may only take a single use to create a fingerprinting or machine learning ID. Regardless, after an amount of time and a number of users, the product (or perhaps the connected hub or even server) will have a list of fingerprint IDs associated with the product. When a new session begins, the product (or the communication device or the server) can look at the configuration settings and behavior to determine which of the associated fingerprint IDs is now using the product (or whether it does not recognize the current user). For a lawnmower, for instance, the second it is started on Tuesday morning, if a particular user is the only user who matches that pattern, it may assume it is that user. If not, it may not be able to determine it is a particular user until the user adjusts the height or starts pushing the lawn mower. At some point, the fingerprinting algorithm will detect it is a particular user, and then can start providing an experience that will work best for that user. For instance, if day of the week is sufficiently unique, as soon the mower is pulled out on a Tuesday, the height could automatically be adjusted to match a user's profile.

The analytics engine 104 further includes a reporting module 114, which provides results of the analysis module 112, including identification of unique users 122, to the product manufacturer, retailer, and/or other entity or group 124. For the product manufacturer, this provides improved analytics that provides a better understanding of the product manufacturer's user base and may allow the product manufacturer to provide a better experience to users. While a manufacturer might use the data to improve the product, the retailer might use the data to determine how best to remarket to users, a part manufacturer may use the data to improve its particular part of the entire system, and a $3^{rd}$ party system such as a Eco-Friendly Certificate provider may use it to measure fuel efficiency.

The analytics engine 104 is implemented via any type of computing device, such as computing device 500 described with reference to FIG. 5, for example. It should be understood that any number of analytics engines may be employed within the system 100 within the scope of the present invention. Each may comprise a single device or multiple devices cooperating in a distributed environment. For instance, the analytics engine 104 may be provided via multiple devices arranged in a distributed environment that collectively provide the functionality described herein. Additionally, it should be understood that other components not shown may also be included within the network environment.

Figure 2A:
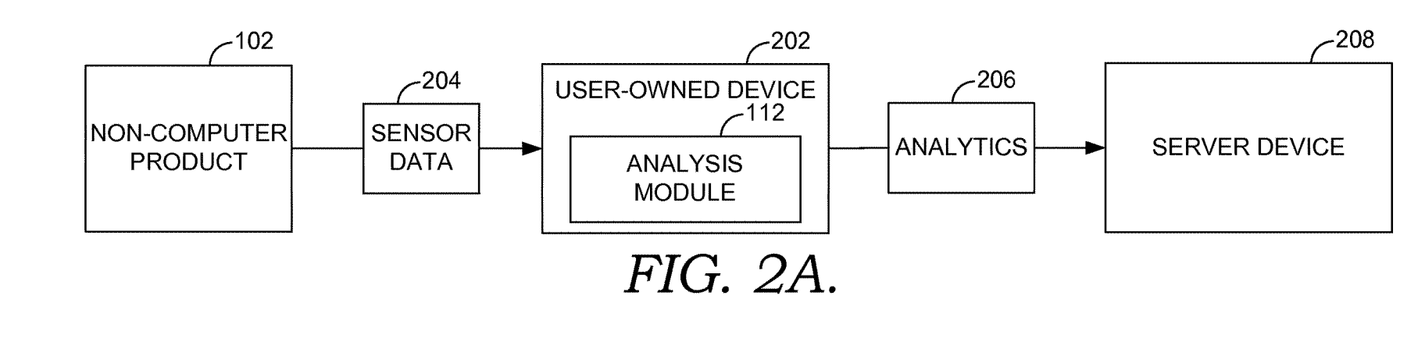
FIGS. 2A-2C are block diagrams illustrating different configurations in accordance with various embodiments of the present invention.
Figure 2B:
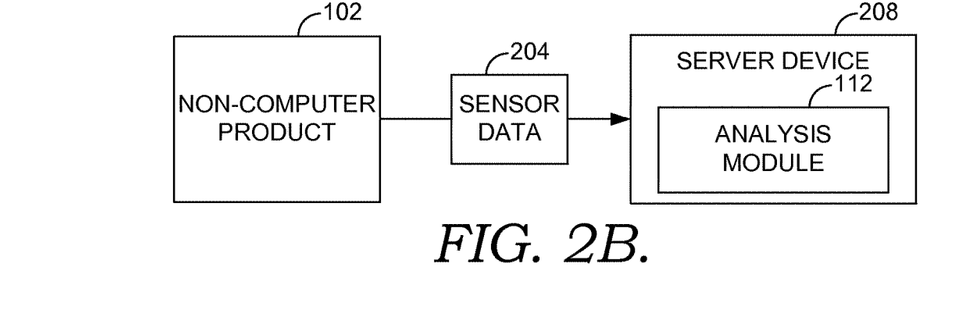
Figure 2C:
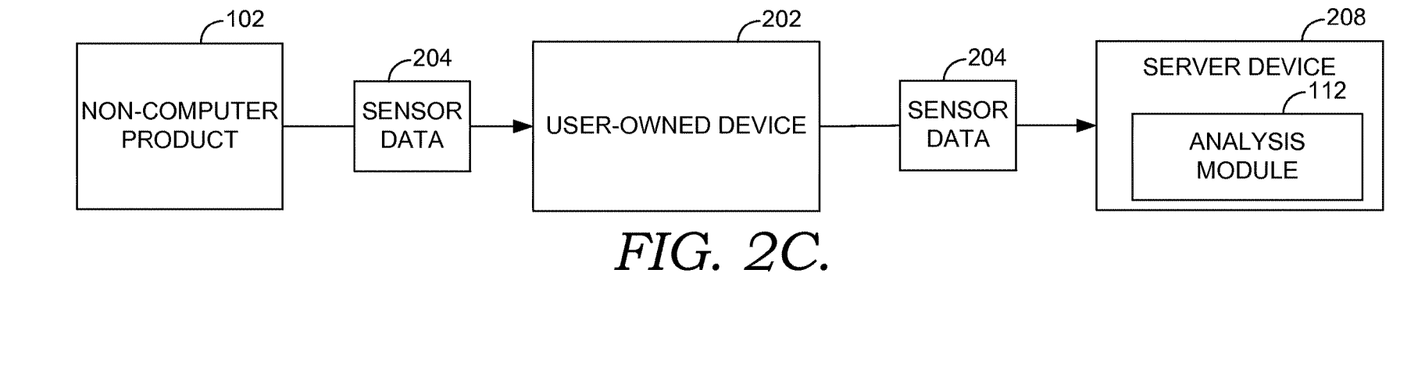

In various embodiments of the present invention, the analytics engine 104 (or at least the analysis module 112) is provided on a user-owned device, such as a smartphone or PC, which is local to the non-computer product 102 or on a server device, located remote from the non-computer product 102 and accessible over a network, such as the Internet. FIGS. 2A-2C illustrate some examples of different configurations. FIG. 2A shows an embodiment in which the analysis module 112 is provided on a user-owned device 202 local to the non-computer product 102. In the embodiment of FIG. 2A, sensor data 204 is communicated from the non-computer product 102 to the user-owned device 202, for instance using a short-range communication. The analysis module 112 on the user-owned device 202 analyzes the sensor data 204 to provide analytics 206 that include an identification of unique users. The analytics 206 is then communicated from the user-owned device 204 to a server device 208 to provide the product manufacturer and/or other entities access to the analytics 206.

FIG. 2B shows an embodiment in which the analysis module 112 is provided on the server device 208. In the embodiment of FIG. 2B, sensor data 204 is communicated from the non-computer product 102 to the service device 208, for instance, using a long-range communication device on the non-computer product 102. The analysis module 112 on the server device 208 analyzes the sensor data 204 to provide analytics.

FIG. 2C shows another embodiment in which the analysis module 112 is provided on the server device 208. In the embodiment of FIG. 2C, the non-computer product 102 does not have long-range communication capabilities and employs the user-owned device 202 to communicate sensor data 204 to the server device 208. In particular, the non-computer product 102 communicates the sensor data 204 to the user-owned device 202, which then communicates the sensor data 202 to the server device 208. The user-owned device 202, could be, for instance, a home router, which allows the non-computer product 102 to communicate the sensor data 204 to the server device 208 over the Internet. The server device 208 receives the sensor data 204 and analyzes the sensor data 204 to provide analytics.

In still further embodiments (not illustrated), an analysis module is provided on a non-computer product. In such embodiments, sensor data is both collected and analyzed on the non-computer product. For instance, the non-computer product may be configured with a processor that provides for such analysis. The non-computer product then communicates analytics to a server device to provide the product manufacturer or other entity with access to the analytics.

Figure 3:
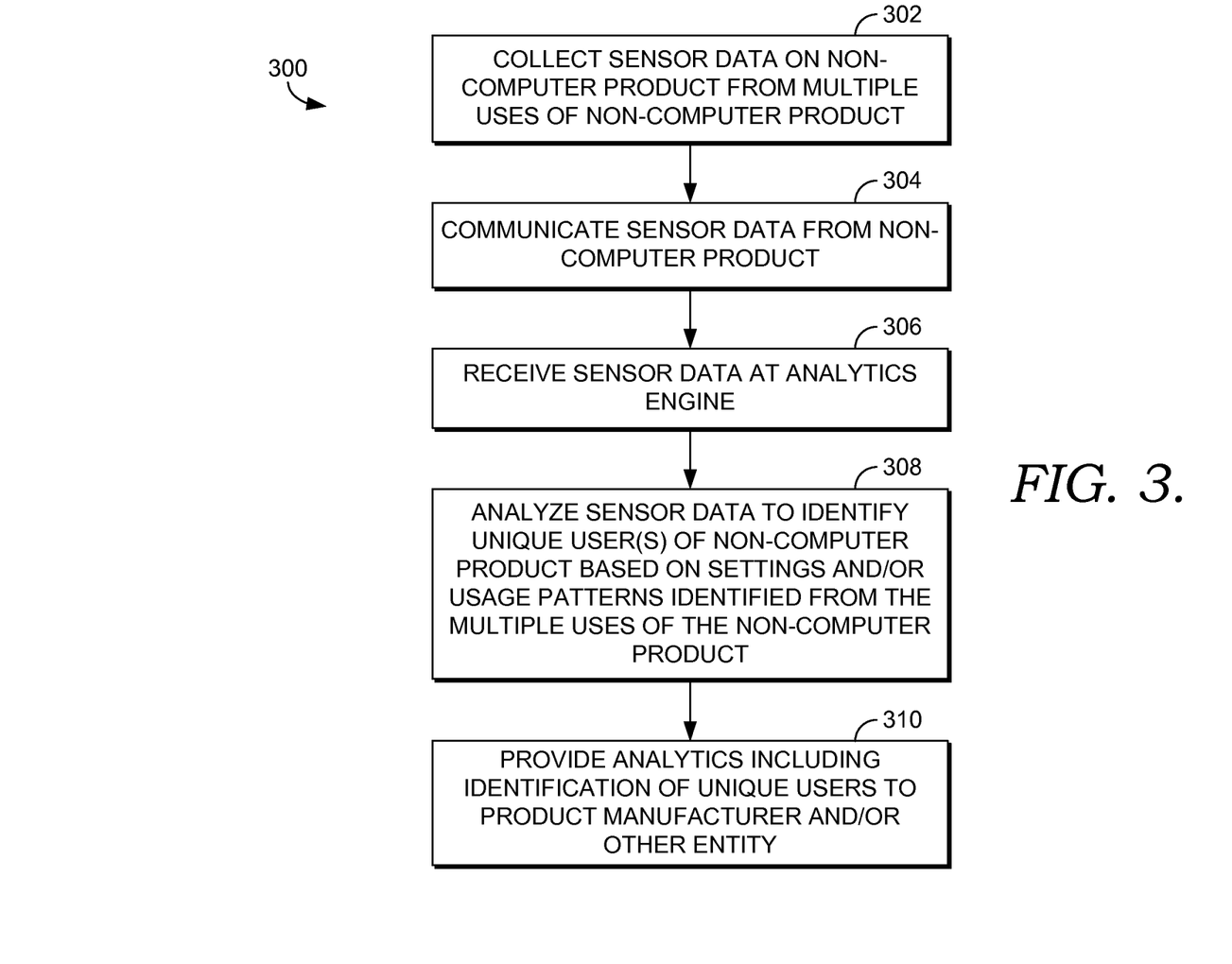
FIG. 3 is a flow diagram showing a method for identifying unique users of a non-computer product in accordance with embodiments of the present invention.

With reference now to FIG. 3, a flow diagram is provided that illustrates a method 300 for identifying unique users of a non-computer product. Each block of the method 300 and any other method discussed herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. For example, the method 300 may be performed using a computing device, such as the computing device 500 of FIG. 5.

As shown at block 302, sensor data is collected by sensors on a non-computer product. The sensor data is collected during multiple uses of the non-computer product by one or more users. The sensor data is communicated from the non-computer product to an analytics engine, as shown at block 304. In some configurations, the sensor data is collected by the sensors when the non-computer product is not communicatively connected to any other device or online service. In such configurations, the sensor data is stored and transmitted to the analytics engine at a later time when the non-computer product is connected. In other configurations, the non-computer product is connected for communicating the sensor data as it is collected. Any and all such variations are contemplated to be within the scope of embodiments of the present invention.

The sensor data is received by the analytics engine, as shown at block 306. In some embodiments, in addition to sensor data, an indication of the type of non-computer product is also received, while in other configurations, such indication is not needed. The sensor data associated with the multiple uses of the non-computer product is analyzed at block 308 to identify unique users of the non-computer product. In some instances, there is only one unique user identified, while in other instances, multiple unique users are identified. This, of course, depends on the use of the non-computer product. As discussed previously, the analysis may employ machine-learning techniques to identify settings and/or usage patterns from the sensor data associated with the various uses of the non-computer product to determine whether there are different patterns of settings/usage that correspond with different users. This allows for the determination of the number of unique users of the non-computer product. Analytics from the analysis, including an identification of unique users, are communicated to the product manufacturer and/or other entity (e.g., retailer), as shown at block 310.

Figure 4:
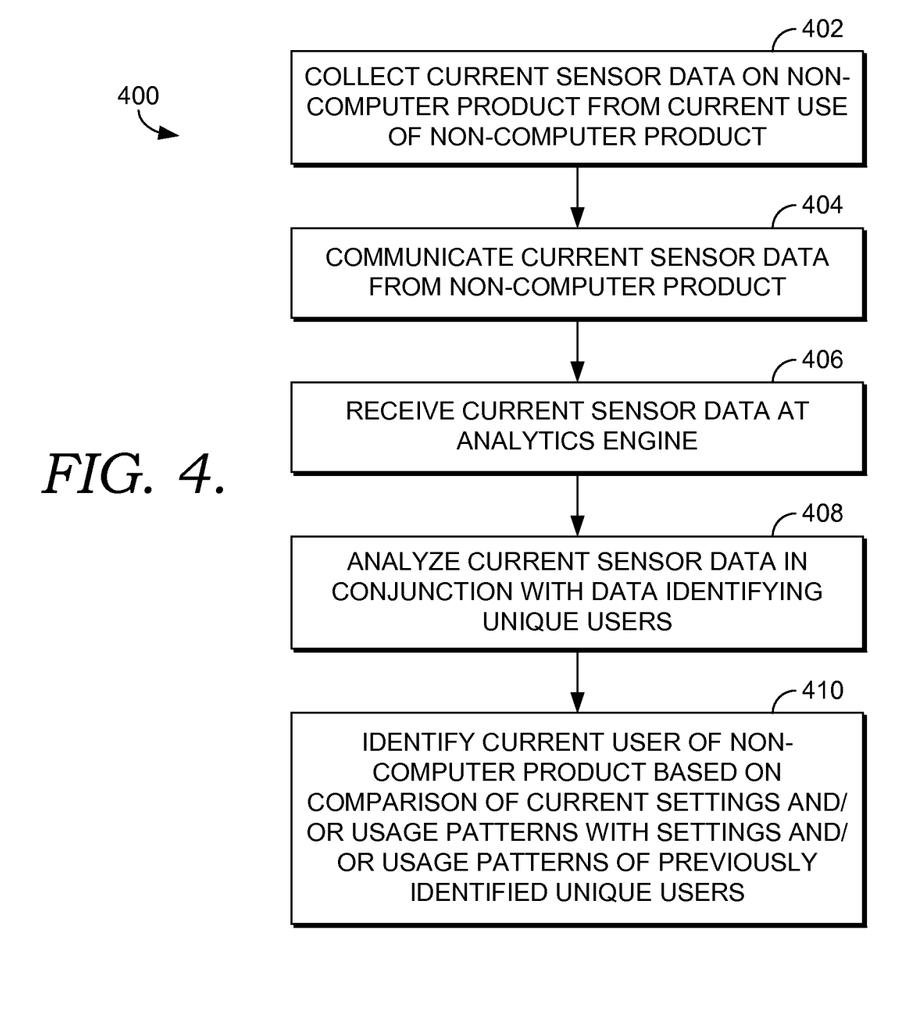
FIG. 4 is a flow diagram showing a method for identifying a current user of a non-computer product in accordance with embodiments of the present invention.

Turning now to FIG. 4, a flow diagram is provided illustrating a method 400 for identifying a current user of a non-computer product. As shown at block 402, current sensor data is collected by sensors on the non-computer product from a current use of the non-computer product. The current sensor data is communicated to an analytics engine, as shown at block 404. The current sensor data is received by the analytics engine, as shown at block 406. The analytics engine analyzes the current sensor data in conjunction with data regarding unique users previously identified for the non-computer product. For instance, unique users of the non-computer product may have been previously identified using the method 300 of FIG. 3, and data regarding the identified unique users stored. As shown at block 410, a current user of the non-computer product is identified based on a comparison of current settings and/or usage patterns identified from the current sensor data to settings and/or usage patterns associated with previously identified unique users.

Identifying the current user of the non-computer product may enable a number of things. For instance, configuration settings may be stored for different unique users. When a particular user is identified as a current user, the configuration settings are communicated to the non-computer product, and the settings on the non-computer product are adjusted based on those configurations settings. In some embodiments, the configuration settings are stored on the non-computer product, and an indication of the current user is communicated to the non-computer product, which then employs the configuration settings for the identified current user.

Having described embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 5:
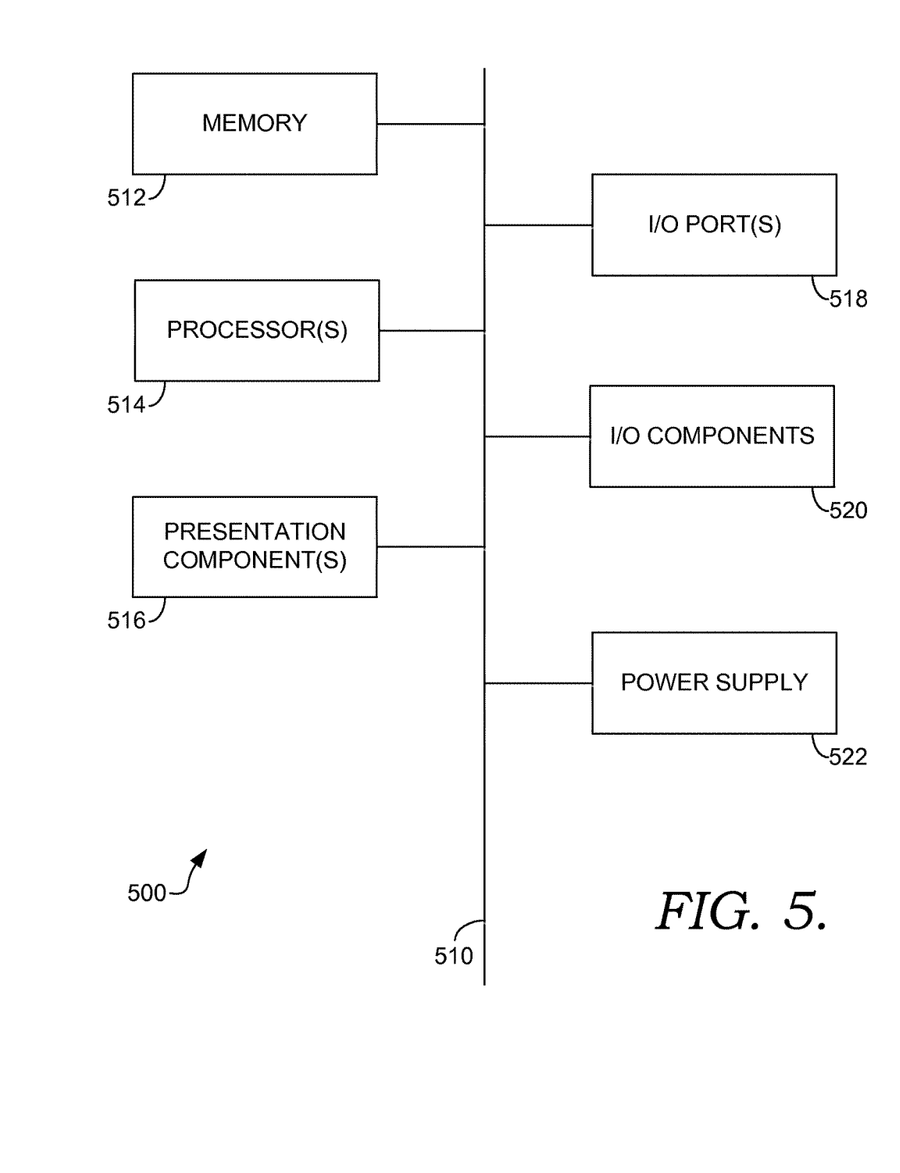
FIG. 5 is a block diagram of an exemplary computing environment suitable for use in implementing embodiments of the present invention.

With reference to FIG. 5, computing device 500 includes a bus 510 that directly or indirectly couples the following devices: memory 512, one or more processors 514, one or more presentation components 516, input/output (I/O) ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

As can be understood, embodiments of the present invention are generally directed to identifying unique users of non-computer products. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computerized method comprising:
    receiving sensor data collected from one or more sensors on a non-computer product from multiple uses of the non-computer product by multiple unique users, the non-computer product having a primary function unrelated to providing computer processing capabilities and not relying on a connection to an online service;
    collectively analyzing the sensor data from the multiple uses of the non-computer product to identify the unique users of the non-computer product based on settings on the non-computer product and/or usage patterns of the non-computer product identified from the sensor data from the multiple uses of the non-computer product; and
    providing analytics comprising at least an indication of the unique users.

2. The method of claim 1, wherein the sensor data provides data regarding settings on the non-computer product.

3. The method of claim 1, wherein the sensor data provides data regarding usage patterns of the non-computer product.

4. The method of claim 1, wherein the sensor data is collected and stored on the non-computer product while the non-computer product is unconnected to any other device, and the sensor data is communicated from the non-computer product when the non-computer product is connected to at least one other device permitting communication of the sensor data from the non-computer product.

5. The method of claim 1, wherein the method is performed on the non-computer product.

6. The method of claim 1, wherein the method is performed on a user-owned device local to the non-computer product.

7. The method of claim 1, wherein the method is performed on a server device remote from the non-computer product.

8. The method of claim 1, wherein the method further comprises:
    receiving current sensor data from the non-computer product;
    analyzing the current sensor data in conjunction with data identifying the unique users; and
    identifying a current user of the non-computer product based on analyzing the current sensor data.

9. The method of claim 8, wherein the method further comprises:
    accessing one or more configuration settings for the current user; and
    communicating the one or more configuration settings for the current user to the non-computer product.

10. The method of claim 1, wherein the method further comprises:
    identifying a number of unique users for each of a plurality of non-computer products based on sensor data from each of the non-computer products; and
    determining a user base size for the plurality of non-computer products based on the number of unique users for each of the plurality of non-computer products.

11. One or more computer storage media storing computer-useable instructions that, when used by one or more computing devices, cause the one or more computing devices to perform operations comprising:
    receiving sensor data collected from one or more sensors on a non-computer product from multiple uses of the non-computer product by multiple unique users, the non-computer product having a primary function unrelated to providing computer processing capabilities and not relying on a connection to an online service;
    collectively analyzing the sensor data from the multiple uses of the non-computer product to identify the unique users of the non-computer product based on settings on the non-computer product and/or usage patterns of the non-computer product identified from the sensor data from the multiple uses of the non-computer product;
    receiving current sensor data from the non-computer product;

analyzing the current sensor data in conjunction with data identifying the unique users of the non-computer product by comparing settings on the non-computer product and/or usage patterns of the non-computer product from the current sensor data with settings on the non-computer product and/or usage patterns of the non-computer product from the data identifying the unique users of the non-computer product; and identifying a current user of the non-computer product based on analyzing the current sensor data.

12. The one or more computer storage media of claim 11, wherein the operations further comprise:

accessing one or more configuration settings for the current user; and communicating the one or more configuration settings for the current user to the non-computer product.

13. The one or more computer storage media of claim 11, wherein the current sensor data provides data regarding settings on the non-computer product.

14. The one or more computer storage media of claim 11, wherein the current sensor data provides data regarding usage patterns of the non-computer product.

15. The one or more computer storage media of claim 11, wherein the one or more computing devices comprise a user-owned device local to the non-computer product.

16. The one or more computer storage media of claim 11, wherein the one or more computing devices comprise a server device remote from the non-computer product.

17. A computer system comprising:

one or more processors; and one or more computer storage media storing computer components providing computer-useable instructions for causing the one or more processors to perform operations, the computer components comprising:

a sensor data interface that receives sensor data from one or more sensors on a non-computer product from multiple uses of the non-computer product by multiple unique users, the non-computer product having a primary function unrelated to providing computer processing capabilities and not relying on a connection to an online service; and an analysis module that collectively analyzes the sensor data from the multiple uses of the non-computer product to identify the unique users of the non-computer product based on settings on the non-computer product and/or usage patterns of the non-computer product identified from the sensor data from the multiple uses of the non-computer product.

18. The system of claim 17, wherein the computer components further comprise a reporting module that provides analytics comprising at least an indication of the unique users to a product manufacturer.

19. The system of claim 17, wherein the system comprises a user-owned device local to the non-computer product.

20. The system of claim 17, wherein the system comprises a server device remote from the non-computer product.

* * * * *